United States Patent
Yoon et al.

(10) Patent No.: US 11,715,468 B2
(45) Date of Patent: Aug. 1, 2023

(54) ELECTRONIC DEVICE AND OPERATION METHOD THEREOF

(71) Applicant: SAMSUNG ELECTRONICS CO., LTD., Suwon-si (KR)

(72) Inventors: Sukhoon Yoon, Suwon-si (KR); Minsup Kim, Suwon-si (KR); Kihyun Song, Suwon-si (KR); Wonjae Lee, Suwon-si (KR); Jongkeun Lee, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 234 days.

(21) Appl. No.: 17/169,058

(22) Filed: Feb. 5, 2021

(65) Prior Publication Data

US 2021/0319789 A1    Oct. 14, 2021

(30) Foreign Application Priority Data

Apr. 8, 2020  (KR) .................. 10-2020-0042964

(51) Int. Cl.
*G10L 15/22* (2006.01)
*G10L 15/30* (2013.01)
*G10L 15/065* (2013.01)

(52) U.S. Cl.
CPC ............ *G10L 15/22* (2013.01); *G10L 15/065* (2013.01); *G10L 15/30* (2013.01); *G10L 2015/223* (2013.01)

(58) Field of Classification Search
USPC ...................................... 704/1–504
See application file for complete search history.

(56) References Cited

U.S. PATENT DOCUMENTS

| 9,177,546 B2* | 11/2015 | Sun ................. G10L 15/065 |
| 9,412,373 B2* | 8/2016 | Ma ................... G10L 15/02 |
| 9,443,508 B2* | 9/2016 | Tan ................... G10L 17/04 |
| 9,460,720 B2* | 10/2016 | Ma ................... G06F 1/325 |
| 9,466,288 B2* | 10/2016 | Zhang ............... G10L 25/48 |

(Continued)

FOREIGN PATENT DOCUMENTS

| KR | 10-2016-0001965 A1 | 1/2016 |
| KR | 10-1713770 B1 | 3/2017 |

OTHER PUBLICATIONS

International Search Report (PCT/ISA/210) and Written Opinion (PCT/ISA/237) issued by the International Searching Authority in International Application No. PCT/KR2021/001353, dated May 6, 2021.

*Primary Examiner* — Marcus T Riley
(74) *Attorney, Agent, or Firm* — Sughrue Mion, PLLC

(57) ABSTRACT

Provided are an electronic device and an operation method thereof. The electronic device includes: a first sound receiver configured to receive a sound input while power is supplied to the first sound receiver in a standby state; a trigger word/phrase recognizer configured to recognize whether the sound input received by the first sound receiver corresponds to a trigger word or phrase; a second sound receiver configured to receive a sound input by receiving supply of power based on the trigger word or phrase being recognized by the trigger word/phrase recognizer; and a data transceiver configured to output a first sound input signal supplied from the first sound receiver and a second sound input signal supplied from the second sound receiver.

17 Claims, 9 Drawing Sheets

(56) References Cited

U.S. PATENT DOCUMENTS

| | | | |
|---|---|---|---|
| 9,721,560 B2* | 8/2017 | Sun | G10L 15/065 |
| 9,785,706 B2* | 10/2017 | Tan | G06F 16/683 |
| 9,830,907 B2* | 11/2017 | Ryu | H04N 5/63 |
| 10,199,051 B2* | 2/2019 | Binder | G10L 17/24 |
| 10,381,021 B2* | 8/2019 | Zhang | G10L 25/09 |
| 10,843,989 B2* | 11/2020 | Koss | C10K 1/165 |
| 10,867,611 B2* | 12/2020 | Tan | G10L 17/04 |
| 2014/0136195 A1* | 5/2014 | Abdossalami | G10L 15/26 704/235 |
| 2014/0222436 A1* | 8/2014 | Binder | G10L 17/24 704/275 |
| 2015/0063575 A1* | 3/2015 | Tan | G06F 16/683 381/56 |
| 2015/0066495 A1* | 3/2015 | Zhang | G10L 25/09 704/231 |
| 2015/0066497 A1* | 3/2015 | Sun | G10L 15/065 704/233 |
| 2015/0066498 A1* | 3/2015 | Ma | G06F 1/325 704/233 |
| 2015/0073795 A1* | 3/2015 | Tan | G10L 17/02 704/243 |
| 2015/0179176 A1* | 6/2015 | Ryu | H04N 21/42203 704/275 |
| 2015/0371638 A1* | 12/2015 | Ma | G10L 15/02 704/275 |
| 2016/0071513 A1* | 3/2016 | Sun | G10L 15/065 704/244 |
| 2016/0351197 A1* | 12/2016 | Tan | G10L 17/02 |
| 2016/0379667 A1* | 12/2016 | Zhang | G10L 15/02 704/270 |
| 2017/0365257 A1 | 12/2017 | Lin et al. | |
| 2018/0174581 A1 | 6/2018 | Wang | |
| 2019/0027145 A1 | 1/2019 | Kerr | |
| 2019/0308919 A1* | 10/2019 | Koss | C10K 1/165 |
| 2020/0013407 A1 | 1/2020 | Chae | |
| 2020/0125162 A1* | 4/2020 | D'Amato | G06F 3/167 |
| 2020/0302929 A1 | 9/2020 | Subhojit et al. | |
| 2021/0319789 A1* | 10/2021 | Yoon | G10L 15/065 |
| 2022/0238120 A1* | 7/2022 | Jones | G10L 15/05 |

* cited by examiner

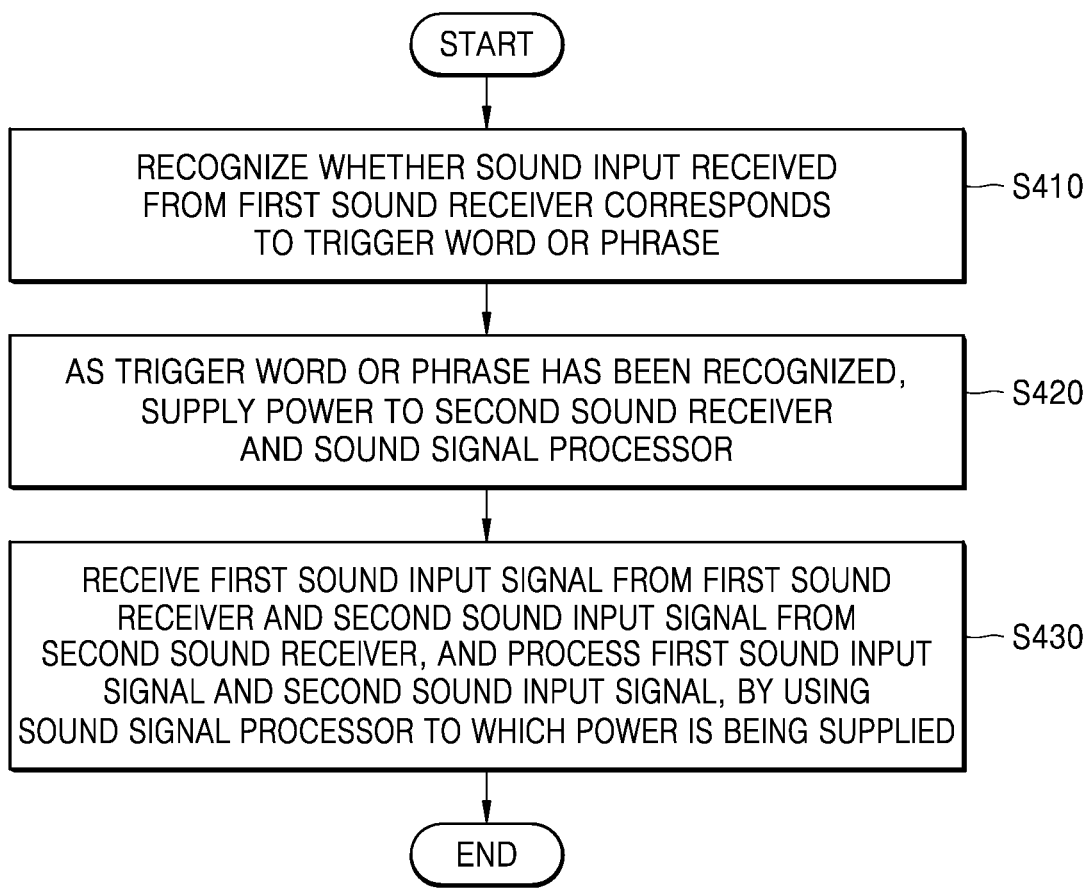

ELECTRONIC DEVICE AND OPERATION METHOD THEREOF

CROSS-REFERENCE TO RELATED APPLICATION

This application is based on and claims priority under 35 U.S.C. § 119 to Korean Patent Application No. 10-2020-0042964, filed on Apr. 8, 2020, in the Korean Intellectual Property Office, the disclosure of which is incorporated by reference herein in its entirety.

BACKGROUND

1. Field

Various embodiments of the disclosure relate to an electronic device and an operation method thereof and, more particularly, to an electronic device for receiving and processing a speech signal to be used fora speech recognition function, and an operation method thereof.

2. Description of Related Art

Recently, various devices that support a speech recognition function have been distributed. The speech recognition function may mean a function of recognizing a user's utterance and processing data to perform a certain function based on the recognized utterance. In addition, devices implementing a speech recognition function combined with artificial intelligence may perform various functions such as searching for video/audio content, searching for living-related information, or executing a specific application. Such speech recognition functions may be implemented in various computing devices such as a speaker, a TV, a smart phone, or an over the top (OTT) box.

Such a device implementing a speech recognition function has to be always in a ready state to perform a function of recognizing a received utterance whenever the user's utterance is received, because of characteristics of the speech recognition function. Therefore, because sensors and speech recognition processing circuits for the speech recognition function have to be always powered on, problems related to increased power consumption due to the sensors and the circuits may occur in portable devices using batteries as a power source.

SUMMARY

Various embodiments of the disclosure are to provide an electronic device having a module capable of processing a speech signal with reduced battery consumption, and an operation method thereof.

Additional aspects will be set forth in part in the description which follows and, in part, will be apparent from the description, or may be learned by practice of the presented embodiments of the disclosure.

According to an embodiment of the disclosure, an electronic device may include: a first sound receiver configured to receive a sound input while power is supplied to the first sound receiver in a standby state of the electronic device; a trigger word/phrase recognizer configured to recognize whether the sound input received by the first sound receiver corresponds to a trigger word or phrase; a second sound receiver configured to receive a sound input by receiving supply of power based on the trigger word or phrase being recognized by the trigger word/phrase recognizer; and a data transceiver configured to output a first sound input signal supplied from the first sound receiver and a second sound input signal supplied from the second sound receiver.

According to an embodiment of the disclosure, the electronic device may further include a power controller configured to control the power to be supplied to the second sound receiver based on a control signal indicating the recognizing of the trigger word or phrase being received from the trigger word/phrase recognizer.

According to an embodiment of the disclosure, the electronic device may further include a sound signal processor configured to receive the first sound input signal supplied from the first sound receiver and the second sound input signal supplied from the second sound receiver, and process the first sound input signal and the second sound input signal based on the power being supplied to the sound signal processor when the trigger word or phrase is recognized by the trigger word/phrase recognizer.

According to an embodiment of the disclosure, the sound signal processor may be further configured to generate a stereo signal by mixing the first sound input signal with the second sound input signal.

According to an embodiment of the disclosure, the power controller may be further configured to, based on a key input signal for requesting a speech recognition function being received, supply the power to the second sound receiver, and cease power supply to the first sound receiver, and the data transceiver may be further configured to receive the second sound input signal from the second sound receiver operating and output the received second sound input signal.

According to an embodiment of the disclosure, the power controller may be further configured to control cease power supply to the second sound receiver based on the speech recognition function being terminated.

According to an embodiment of the disclosure, the electronic device may further include a flag inserting unit configured to insert, into the second sound input signal output in response to the key input signal, a flag for distinguishing the second sound input signal output in response to the key input signal from the first sound input signal output in response to the recognizing of the trigger word or phrase.

According to an embodiment of the disclosure, based on the flag, the second sound input signal output in response to the key input signal may be subjected to sound processing that is different from sound processing to be performed on the first sound input signal output in response to the recognizing of the trigger word or phrase.

According to an embodiment of the disclosure, the electronic device may further include a switch connected to the second sound receiver, and the switch may be configured to transmit, based on the key input signal requesting the speech recognition function being received, the second sound input signal supplied from the second sound receiver to the data transceiver, or transmit, based on the recognizing of the trigger word or phrase, the second sound input signal to the sound signal processor configured to process the second sound input signal with the first sound input signal.

According to an embodiment of the disclosure, an operation method of an electronic device may include: receiving a sound input, by a first sound receiver to which power is supplied in a standby state of the electronic device; recognizing whether the sound input received from the first sound receiver corresponds to a trigger word or phrase; receiving a sound input by a second sound receiver to which the power is supplied based on the trigger word or phrase being recognized; and outputting, by a data transceiver, a first sound input signal supplied from the first sound receiver and a second sound input signal supplied from the second sound receiver.

According to an embodiment of the disclosure, a computer readable recording medium comprising a program executing an operation method of an electronic device in which the operation method may include: receiving a sound input, by a first sound receiver to which power is supplied in a standby state of the electronic device; recognizing whether the sound input received by the first sound receiver corresponds to a trigger word or phrase; receiving a sound input by a second sound receiver to which the power is supplied based on the trigger word or phrase being recognized; and outputting, by a data transceiver, a first sound input signal supplied from the first sound receiver and a second sound input signal supplied from the second sound receiver.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 4 is a flowchart for explaining operations of an electronic device according to an embodiment of the disclosure;

DETAILED DESCRIPTION

Figure 1:
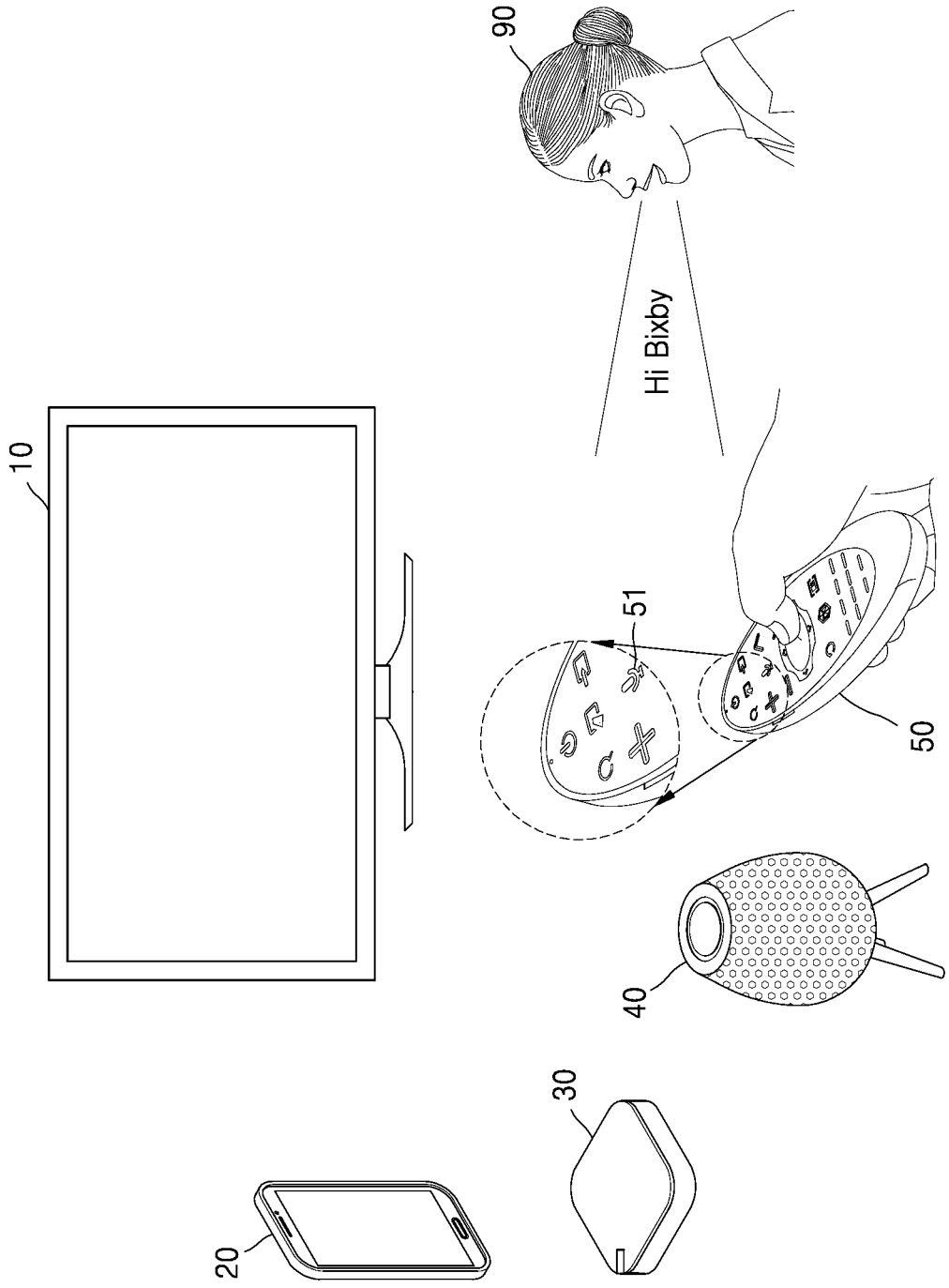
FIG. 1 is a reference diagram for explaining a system to which various embodiments of the disclosure are applied.

Terms used in the specification will be briefly described, and the disclosure will be described in detail.

General and widely used terms have been employed herein, in consideration of functions provided in the disclosure, and may vary according to an intention of one of ordinary skill in the art, a precedent, or emergence of new technologies. Additionally, in some cases, an applicant may arbitrarily select specific terms, in which case, the applicant will provide the meaning of the terms in the description of the embodiments. Accordingly, the terms used herein should be interpreted as having a meaning that is consistent with their meaning in the context of the relevant art and should not be interpreted in an idealized or overly formal sense.

Throughout the specification, when a portion "includes" an element, another element may be further included, rather than excluding the existence of the other element, unless otherwise described. In addition, terms such as " . . . unit", " . . . module", or the like refer to units that perform at least one function or operation, and the units may be implemented as hardware or software or as a combination of hardware and software.

Embodiments will be described with reference to the accompanying drawings in such a manner that the embodiments may be easily carried out by one of skill in the art. However, the disclosure may have different forms and should not be construed as being limited to the descriptions set forth herein. In order to clearly describe the disclosure, portions that are not relevant to the description of the disclosure are omitted, and similar reference numerals are assigned to similar elements throughout the specification.

Throughout the disclosure, the expression "at least one of a, b or c" indicates only a, only b, only c, both a and b, both a and c, both b and c, all of a, b, and c, or variations thereof.

In embodiments of the specification, the term "user" refers to a person who controls functions or operations of a computing device or an electronic device using a control device, and may include a viewer, a manager, or an installer.

FIG. 1 is a reference diagram for explaining a system to which various embodiments are applied.

Elements for a speech recognition function according to various embodiments of the disclosure may be applied to various electronic devices. Referring to FIG. 1, the elements for the speech recognition function according to various embodiments of the disclosure may be applied to electronic devices, for example, a display device 10 such as a TV, a smart phone 20, an OTT box 30, a speaker 40, or a remote controller 50.

The speech recognition function may be applied to, for example, the remote controller 50 or the like to control the display device 10. For example, the user may control the display device 10 simply by starting an utterance toward the remote controller 50 or may trigger an utterance receiving microphone to operate by pressing a microphone button 51 provided in the remote controller 50.

The speech recognition function may be combined with artificial intelligence technology to provide a speech assistant service. An artificial intelligence system is a computer system for implementing human-level intelligence in which a machine itself learns, makes decisions, and obtains a higher recognition rate the more it is used. Artificial intelligence technology includes machine-learning (e.g., deep-learning) technology that uses an algorithm for classifying/learning features of input data by itself, and element technologies for copying cognition and decision functions of the human brain through a machine-learning algorithm. The element technologies may include at least one of language understanding technology for recognizing human languages/characters, visual understanding technology for recognizing objects like human vision, inference/prediction technology for determining information and performing logical inference and prediction, knowledge representation technology for processing human experience information to knowledge data, or motion control technology for controlling autonomous driving of vehicles or the motion of robots.

In general, each speech recognition function module receives a unique trigger word or wake-up word, recognizes the received trigger word or wake-up word, and enters a state of listening to next utterances from a user 90. For example, the speech recognition function module may be woken up by a trigger phrase "Hi Bixby".

Typically, the speech recognition function module has learned to recognize its own unique trigger word or phrase used to invoke the speech recognition function module, but the disclosure is not limited thereto, and the speech recognition function module may have learned to recognize a plurality of trigger words or phrases.

The speech recognition function for controlling various devices by the user's utterance may be divided into short-range speech recognition that is triggered by a button input, and long-range speech recognition that is triggered by a specific utterance. The short-range speech recognition has a limitation on interactions because the user has to hold a specific device, press a button on the device and then speak. That is, because the user who intends to use the speech recognition function may initiate the speech recognition function only by pressing the button on the electronic device, there is a limitation in that the user has to hold the electronic device in order to use the speech recognition function. On the other hand, for the long-range speech recognition which is triggered by the specific utterance, the user may control the device within a certain distance in a more convenient manner, that is, simply by speaking the trigger word or phrase.

In a long-range speech recognition device according to the related art, because the user may speak anytime, power has to be supplied to the microphone all the time in order for the speech recognition function to be triggered. Accordingly, there is a limitation in that the device has to be installed in a place where the power may be continuously supplied, or there is inconvenience in that, in a case of a battery-powered device, the battery has to be frequently charged because of its limited usage time less than a day.

That is, in conventional long-range speech recognition, because the user may speak the trigger word or phrase anytime, every sound has to be recorded and analyzed. For this reason, a microphone-related block entails a current consumption all the time, and accordingly, a long-range speech recognition module has to be applied to devices that may be stably supplied with power. In a case of a device such as a TV remote controller, because low-power technology is necessary such that general alkaline batteries (e.g., two AA or AAA batteries) endure about a year supplying power to the device without replacement, the device is designed in a button-type push-to-talk scheme. In a case where the long-range speech recognition is applied to such remote controller, because the user may speak anytime, a microphone block has to be enabled all the time. Accordingly, standby power increases, resulting in the user's inconvenience of using batteries having a large capacity or frequently replacing the batteries.

Embodiments disclosed in the disclosure are to provide an electronic device capable of performing a long-range speech recognition function without constant power supply.

Figure 2:
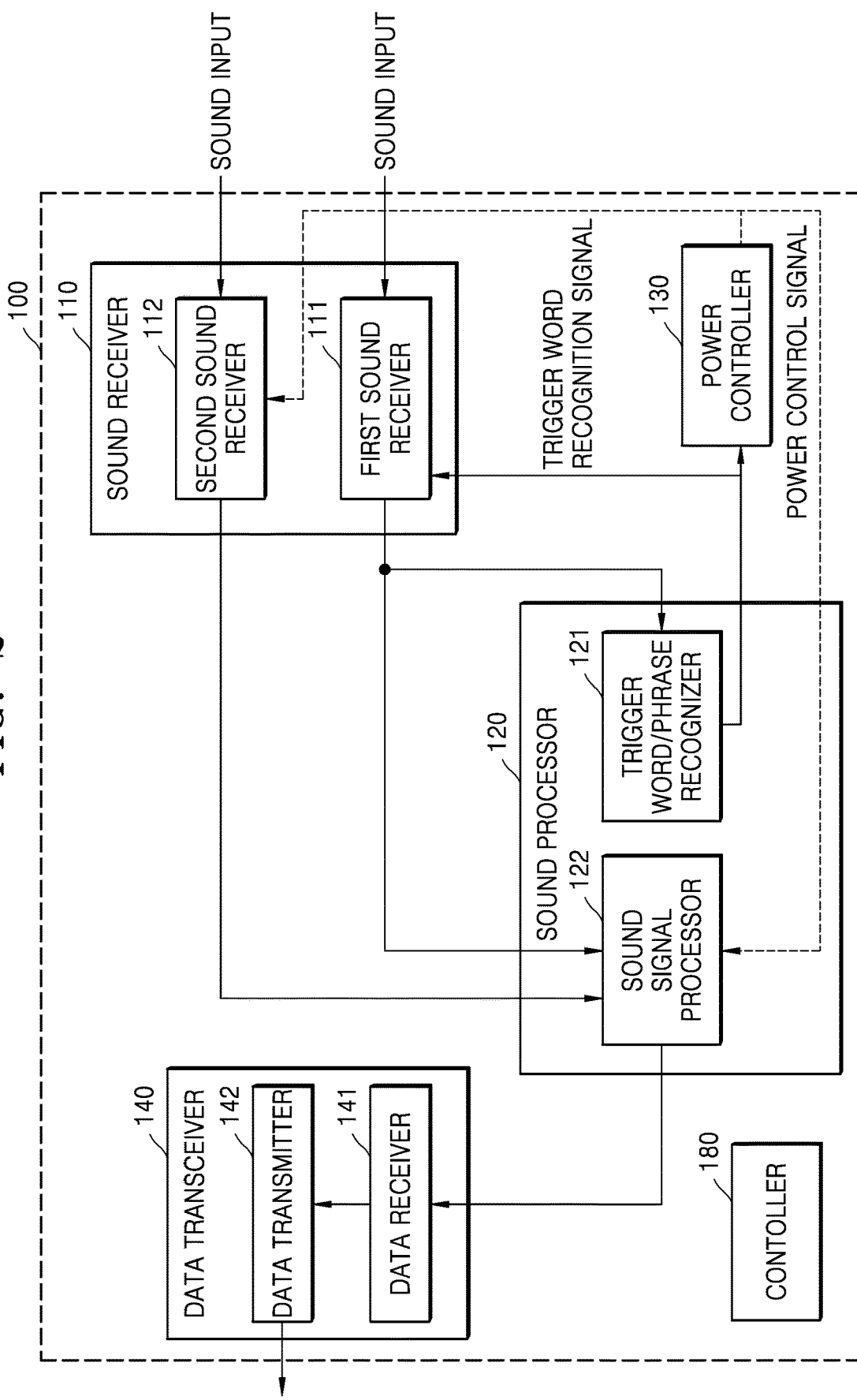
FIG. 2 is an example block diagram of an electronic device according to an embodiment of the disclosure.

FIG. 2 is an example block diagram of an electronic device 100 according to an embodiment of the disclosure.

Referring to FIG. 2, the electronic device 100 may include a sound receiver 110, a sound processor 120, a power controller 130, a data transceiver 140, and a controller 180. At least some elements of the electronic device 100, for example, the sound receiver 110, the sound processor 120, the power controller 130, or the data transceiver 140, may be electrically connected to the controller 180. In various embodiments of the disclosure, the electronic device 100 may be referred to as a computing device or a remote control device, and may further include elements in addition to the elements illustrated in FIG. 2 or some elements may be omitted. For example, the electronic device 100 may further include a display, a memory, a speaker, etc.

The controller 180 may include a processor or the like to control the sound receiver 110, the sound processor 120, the power controller 130, the data transceiver 140, or the like.

The sound receiver 110 may include a first sound receiver 111 and a second sound receiver 112 that receive a sound input.

The sound processor 120 is a block for processing a sound input signal received from the sound receiver 110 and may include the trigger word/phrase recognizer 121 and the sound signal processor 122.

The first sound receiver 111 and the second sound receiver 112 may include a microphone or the like to receive or store a sound input from the outside. The first sound receiver 111 and the second sound receiver 112 may be integrated with or separated from the electronic device 100. The sound receiver separated from the electronic device 100 may be connected to the electronic device 100 through a wired or wireless network.

According to an embodiment of the disclosure, the first sound receiver 111 may constantly receive power supply to detect a sound input received from the outside of the electronic device 100. In other words, the first sound receiver 111 may maintain a state where the power is supplied to receive the sound input, in a standby state of the electronic device 100. The first sound receiver 111 may receive various audio signals, for example, indoor noise, in addition to the user's speech. The first sound receiver 111 may determine that a user speech is input in a case where an intensity of the received sound has increased from an intensity of a previously input sound by a preset value. This is because various audio signals including the user speech are input through the sound receiver in a typical home or office environment. Because noise input in the typical home or office environment has a constant intensity, the sound receiver may detect that the user speech is input in a case where an intensity of a currently input sound has increased from an intensity of a normally input sound, that is, not containing a user speech, by the preset value. For example, in a case where the ordinarily input sound has an intensity of 20 dB, the sound receiver may determine, as the user speech, only a sound having an intensity equal to or greater than the sum of the intensity of the normally input sound and the preset value (e.g., 12 dB).

Alternatively, for example, the first sound receiver 111 may record every sound input received from the outside and determine whether the recorded sound input exceeds a preset threshold. In a case where the first sound receiver 111 has determined that the recorded sound input does not exceed the preset threshold, the first sound receiver 111 may determine that the sound input is not a valid user speech but noise such as living noise, and may not take any action. In a case where the first sound receiver 111 has determined that the recorded sound input exceeds the preset threshold, the first sound receiver 111 may determine that the sound input has valid information. In a case where the first sound receiver 111 has determined that the recorded sound input is valid sound, the first sound receiver 111 may transmit the recorded sound input to the trigger word/phrase recognizer 121 to determine whether the valid sound corresponds to the trigger word or phrase.

In addition, in a case where the first sound receiver 111 receives, from the trigger word/phrase recognizer 121, a control signal indicating that the trigger word or phrase has been recognized, the first sound receiver 111 may transmit the received sound input to the sound signal processor 122 in order to perform sound signal processing on the sound input. That is, in a case where the trigger word/phrase recognizer 121 recognizes that the sound input corresponds to the trigger word or phrase, the electronic device 100 may control the first sound receiver 111 to transmit the received sound input to the sound signal processor 122 in order to perform the sound signal processing on the sound input.

Normally, the power may not be supplied to the second sound receiver 112, and thus the second sound receiver 112 may remain powered off. In a case where the second sound receiver 112 receives a power control signal from the power controller 130, the second sound receiver 112 may be powered on to receive a sound input and transmit the received sound input to the sound signal processor 122. In a case where the trigger word/phrase recognizer 121 has determined that the sound input corresponds to the trigger word or phrase, the power controller 130 may transmit the power control signal to the second sound receiver 112. In this case, that is, where the received sound input has been determined as corresponding to the trigger word or phrase, the power may be supplied to the second sound receiver 112 such that the second sound receiver 112 may receive the sound input, while normally, the second sound receiver 112 may remain powered off without the power being supplied, and thus, power consumption may be reduced.

When the trigger word/phrase recognizer 121 receives the sound input from the first sound receiver 111, the trigger word/phrase recognizer 121 may determine whether the received sound input corresponds to the predefined trigger word or phrase.

According to an embodiment of the disclosure, the trigger word/phrase recognizer 121 may have learned to recognize one or more trigger words or phrases by using an acoustic model, pronunciation symbols, or the like, and thus may recognize the trigger word or phrase. According to an embodiment of the disclosure, the trigger word/phrase recognizer 121 may determine that a trigger word or phrase is recognized, in a case where a recognition score for the trigger word or phrase exceeds a threshold value, whereas the trigger word/phrase recognizer 121 may determine that the trigger word or phrase is not recognized, in a case where the recognition score for the trigger word or phrase does not exceed the threshold value.

In a case where the received sound input has been determined as not corresponding to the predefined trigger word or phrase, the trigger word/phrase recognizer 121 may not perform any further action. In a case where the received sound input has been determined as corresponding to the predefined trigger word or phrase, the trigger word/phrase recognizer 121 may transmit the control signal indicating that the trigger word or phrase has been recognized, to the power controller 130 and the first sound receiver 111 such that subsequent operations may be performed after recognizing the trigger word or phrase.

Normally, that is, in the standby state of the electronic device 100, the power may not be supplied to the sound signal processor 122, and thus the sound signal processor 122 may remain powered off. In a case where the sound signal processor 122 receives a power control signal from the power controller 130, the sound signal processor 122 may be powered on, to receive a first sound input from the first sound receiver 111, and a second sound input from the second sound receiver 112, mix the first sound input signal with the second sound input signal, and transmit a mixed signal to the data transceiver 140. The sound signal processor 122 may generate a stereo signal by mixing the first sound input signal with the second sound input signal. In addition, as the sound signal processor 122 may receive a sound input signal for long-range speech recognition, which is highly likely to contain noise, the sound signal processor 122 may perform denoising or the like. In a case where the trigger word/phrase recognizer 121 has determined that the sound input corresponds to the trigger word or phrase, the power controller 130 may transmit the power control signal to the sound signal processor 122. In a case where the received sound input has been determined as corresponding to the trigger word or phrase, the power may be supplied to the sound signal processor 122 such that the sound signal processor 122 may perform sound processing on the received sound input, while normally, the sound signal processor 122 may remain powered off, and thus, the power consumption may be reduced.

In a case where the power controller 130 receives a trigger word/phrase recognition signal from the trigger word/phrase recognizer 121, the power controller 130 may transmit the power control signal to the second sound receiver 112 and the sound signal processor 122 to control the power to be supplied to the second sound receiver 112 and the sound signal processor 122. As the power control signal is transmitted, the power is supplied to the corresponding elements, and thus the elements may be powered on and enabled.

The data transceiver 140 is a block for transmitting received data, and may include a data receiver 141 and a data transmitter 142. The data transceiver 140 may transmit and receive data to and from the outside using a wireless Internet module or a short-range communication module. For example, the wireless Internet module refers to a module for wireless Internet connection, and some examples of the wireless Internet technology are Wireless LAN (WLAN, Wi-Fi), wireless broadband (Wibro), worldwide interoperability for microwave access (Wimax), and high-speed downlink packet access (HSDPA). The short-range communication module is for communicating within a short distance range. Some examples of the short-range communication technology are Bluetooth, radio frequency identification (RFID), infrared data association (IrDA), ultra wideband (UWB), and ZigBee.

The data receiver 141 may receive signal-processed data from the sound signal processor 122, and may transmit the signal-processed data to the data transmitter 142.

The data transmitter 142 may transmit the data received from the data receiver 141 to an external device. For example, the data transmitter 142 may transmit the received data to the external device through a communication interface.

Depending on the type of an input speech, voice recognition may be divided into isolated word recognition which recognizes an uttered speech by each word, continuous speech recognition which recognizes continuous words, continuous sentences, and conversational speech, and keyword spotting which is a recognition form between the isolated word recognition and the continuous speech recognition and detects and recognizes a predefined keyword. In a case where a user speech has been input, a speech section may be identified by detecting a start point and an end point of an utterance of the user in the input sound signal. The speech section may be identified by calculating energy of the input sound signal, classifying an energy level of the sound signal according to the calculated energy, and performing dynamic programming. In addition, phoneme data may be generated by detecting a phoneme, which is the smallest unit of speech sound, from the sound signal within the identified speech section, based on an acoustic model. Then, text information may be generated by applying a hidden Markov model (HMM) to the generated phoneme data. One or more modules for performing such speech recognition operations may be included in the electronic device 100. In this case, a speech recognition module may receive a signal output from the sound processor 120 and perform speech recognition processing. According to another embodiment of the disclosure, the electronic device 100 may merely obtain sound data to be used for the speech recognition and transmit the obtained sound data to another device through the communication interface or the like. For example, in a case of the electronic device 100 implemented as a remote controller, the data transmitter 142 of the electronic device 100 may transmit the received data to a display device such as a television, by using various communication schemes.

According to the electronic device 100 illustrated in FIG. 2, the second sound receiver 112 and the sound signal processor 122 may be normally powered off without power supply, and may be supplied with the power to perform operations when the trigger word or phrase has been recognized by the trigger word/phrase recognizer 121. Accordingly, because the second sound receiver 112 and the sound signal processor 122 may be supplied with the power and operate when their operations are required, the power consumption may be reduced as the power is not necessarily supplied all the time.

The second sound receiver 112 and the sound signal processor 122 may operate when there is data to be processed after receiving the sound input, and thus, the second sound receiver 112 and the sound signal processor 122 may transition to a power-off state when there is no more sound input received even after the second sound receiver 112 is powered on. For example, the second sound receiver 112 may transition to the power-off state in a case where a time for which a new sound input is not received from the outside exceeds a predefined threshold value. In addition, for example, the sound signal processor 122 may transition to the power-off state in a case where a time for which a new sound input signal is not received from the first sound receiver or the second sound receiver, that is, there is no more data to be processed, exceeds a predefined threshold value.

According to the embodiment illustrated in FIG. 2, the electronic device 100 in the standby state may secure its battery life by supplying the power to a single sound receiver, for example, the first sound receiver 111, to recognize the trigger word or phrase in the sound input received from the first sound receiver rather than supplying the power to both of the first and second sound receivers 111 and 112.

In addition, in a case where the trigger word or phrase has been recognized in the sound input received from the first sound receiver 111, the power may be supplied to the second sound receiver 112 such that the sound input received from the second sound receiver 112 and the first sound input signal received from the first sound receiver 111 may be used for the sound processing, and thus signals for the long-range speech recognition may be efficiently collected.

Furthermore, by separating power lines to the trigger word/phrase recognizer121 and to the sound signal processor 122 from each other, the power may be supplied to the sound signal processor 122 only when the operations of the sound signal processor 122 are actually required, and thus the power consumption may be optimized.

Figure 3A:
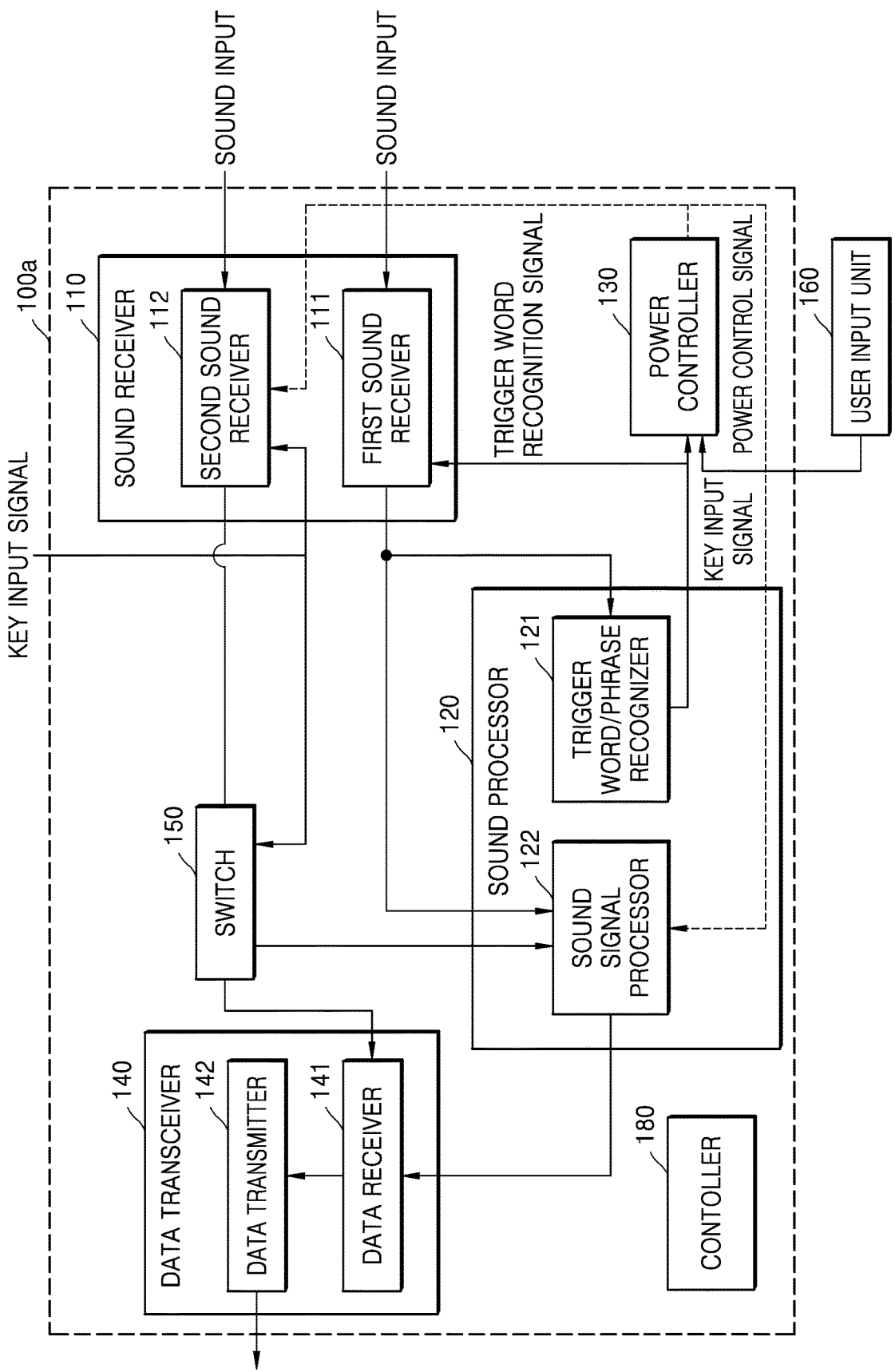
FIG. 3A is another example block diagram of an electronic device according to an embodiment of the disclosure.

FIG. 3A is another example block diagram of an electronic device 100a according to an embodiment of the disclosure.

In the electronic device 100a illustrated in FIG. 3A, a configuration in which the speech recognition function is performed by receiving a key input signal may be further included. As described above, in the long-range speech recognition, the user may trigger the electronic device to perform the speech recognition function by making an utterance whereas, in the short-distance speech recognition, the user may trigger the electronic device to perform the speech recognition function by pressing a button provided in the electronic device 100.

Referring to FIG. 3A, the electronic device 100a may further include a switch 150 and a user input unit 160, in addition to the sound receiver 110, the sound processor 120, the power controller 130, and the data transceiver 140 illustrated in FIG. 2.

Elements corresponding to the same reference numerals in FIGS. 2 and 3A may perform substantially the same functions. However, the electronic device 100a in FIG. 3A may further include the switch 150 for a flow for the speech recognition function triggered by button pressing.

The user input unit 160 may receive a user input for controlling the electronic device 100a. For example, the user input unit 160 may include one or more physical buttons arranged outside the electronic device 100a or a touch input interface. In a case where the user input unit 160 has received a user input signal for requesting the speech recognition function, the user input unit 160 may transmit a control signal corresponding to the user input signal, to the switch 150 and the power controller 130. The control signal corresponding to the user input signal for requesting the speech recognition function may be simply referred to as a "key input signal".

The switch 150 may be triggered by the key input signal. For example, the switch 150 may receive the control signal according to the key input signal generated as a speech recognition function button provided in the electronic device 100a is pressed. In a case where the switch 150 has received the control signal according to the key input signal, the switch 150 may transmit the sound input signal received from the second sound receiver 112, directly to the data receiver 141. That is, the reception of the key input signal may mean that the user has triggered the speech recognition function by holding the electronic device 100a and pressing the button included in the electronic device 100a, and thus that the electronic device 100a is in close proximity to the user. Accordingly, the data for the speech recognition may be sufficiently collected by receiving the sound input through only the second sound receiver 112, rather than receiving the sound input through both of the first and second sound receivers 111 and 112 in the sound receiver 110, and thus the switch 150 may operate to transmit the second sound input signal received from the second sound receiver 112 directly to the data receiver 141.

In a case where the power controller 130 has received the control signal according to the key input signal, the power controller 130 may transmit the power control signal for supplying the power to the second sound receiver 112. Accordingly, the second sound receiver 112 may be supplied with the power and thus powered on after receiving the power control signal, and may then receive the sound input, and transmit the received sound input to the switch 150.

According to an embodiment of the disclosure, because an operation of recognizing the trigger word or phrase is not necessary while the speech recognition function (short-range speech recognition function) triggered by receiving the key input signal is being performed, upon initiation of the short-range speech recognition function by reception of the key input signal, the power controller 130 may cease the power supply to the first sound receiver 111, and may control the power to be supplied to the first sound receiver 111 after the short-range speech recognition function is terminated.

According to an embodiment of the disclosure, the power controller 130 may control, in a normal use state, the first sound receiver 111 to be supplied with the power for the long-range speech recognition, which performs the speech recognition function on the user's utterance, and may control the second sound receiver 112 to be supplied with the power for the sound processing when the trigger word or phrase has been recognized.

According to an embodiment of the disclosure, the power controller 130 may supply the power to the first sound receiver 111 for the long-range speech recognition in the normal use state as described above, but in a case where the key input signal has been received and the short-range speech recognition may be performed with the sound input received by the second sound receiver 112, the power controller 130 may cease the power supply to the first sound receiver 111, and thus the power consumption may be further reduced. In a case where a short-range speech recognition operation by the second sound receiver 112 is terminated, the power controller 130 may resume the power supply to the first sound receiver 111 to prepare for the long-range speech recognition and cease the power supply to the second sound receiver 112.

In a case of performing the long-range speech recognition function in the example of FIG. 3A, the same operations as described in FIG. 2 may be performed. However, in this case, the switch 150 may transmit the second sound input received by the second sound receiver 112 to the sound signal processor 122 of the sound processor 120, rather than transmitting the second sound input directly to the data receiver 141.

That is, in a case of performing the short-range speech recognition function by the switch 150, the switch 150 may transmit the second sound input signal received by the second sound receiver 112 directly to the data receiver 141 whereas, in a case of performing the long-range speech recognition function, the switch 150 may transmit the second sound input signal received by the second sound receiver 112 to the sound signal processor 122 to perform a mixing operation with the first sound input signal.

Figure 3B:
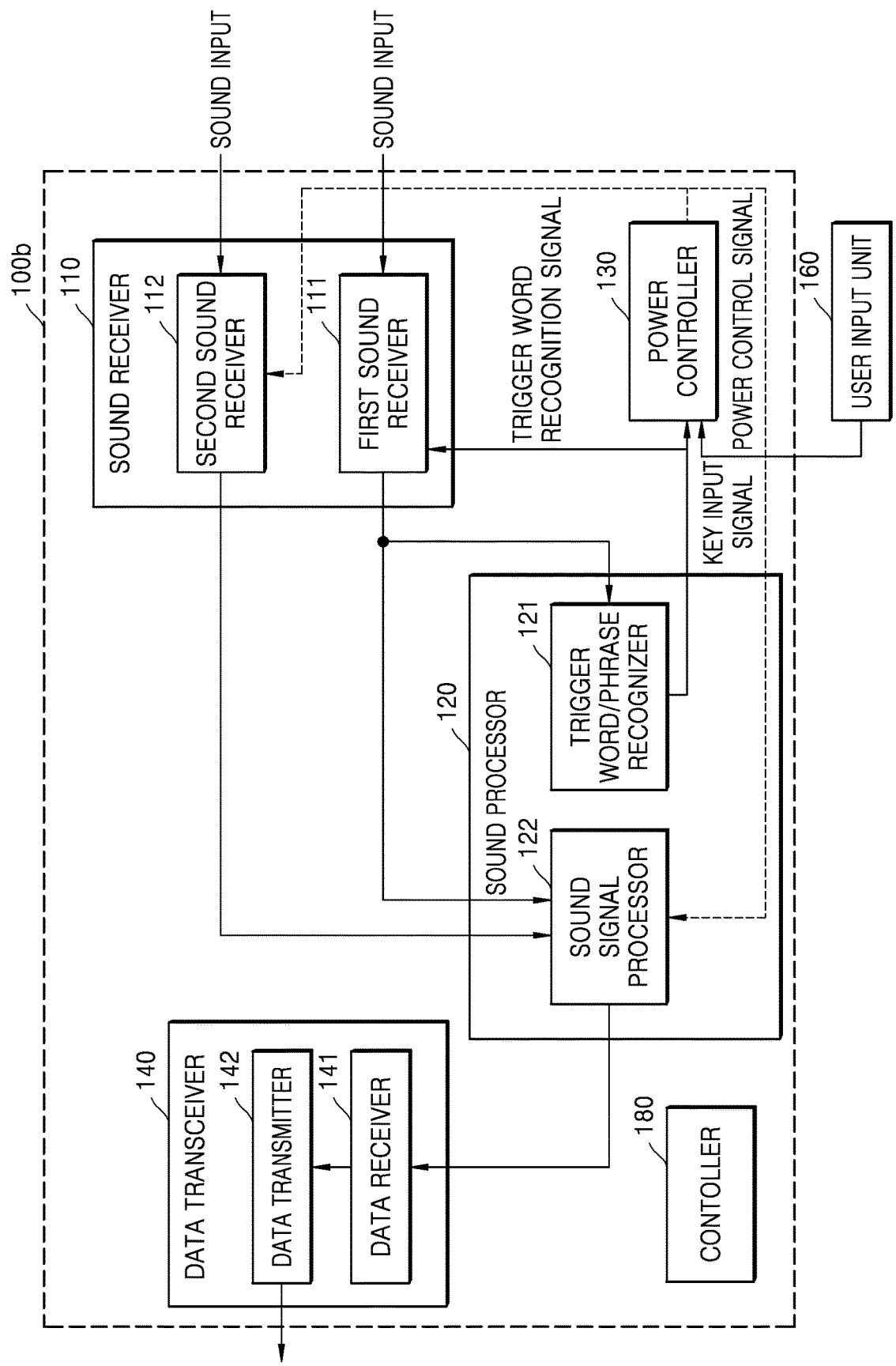
FIG. 3B is another example block diagram of an electronic device according to an embodiment of the disclosure.

FIG. 3B is another example block diagram of an electronic device 100b according to an embodiment of the disclosure.

In the electronic device 100b illustrated in FIG. 3B, a configuration for performing the speech recognition function by receiving the key input signal may be further included. The electronic device 100a illustrated in FIG. 3A includes the switch 150 for receiving the sound input by using one of the sound receivers 111 and 112 included in the sound receiver 120 and transmitting the sound input directly to the data receiver 141, to perform the short-range speech recognition function whereas the electronic device 100b illustrated in FIG. 3B may perform the sound signal processing by using both of the first and second sound receivers 111 and 112 in the sound receiver 110, to perform the short-range speech recognition function.

Accordingly, the control signal according to the key input signal may be transmitted to the power controller 130 and the first sound receiver 111.

In a case where the first sound receiver 111 has received the control signal according to the key input signal, the first sound receiver 111 may transmit the first sound input signal received by the first sound receiver 111, to the sound signal processor 122.

In a case where the control signal according to the key input signal has been received, the power controller 130 may transmit the power control signal for supplying the power to the second sound receiver 112 and the sound signal processor 122. Accordingly, the second sound receiver 112 may be powered on after receiving the power control signal, then receive the second sound input, and transmit the received second sound input to the sound signal processor 122. The sound signal processor 122 may be also powered on after receiving the power control signal, then receive the first sound input signal from the first sound receiver 111 and the second sound input signal from the second sound receiver 112, mix the first sound input signal with the second sound input signal, and output the mixed signal to the data transceiver 140.

That is, although the speech recognition function has been initiated by pressing the button in the electronic device 100b, a distance between the user and the electronic device 100b may be increased after the initiation of the speech recognition function, and thus the electronic device 100b may be implemented to operate by receiving the sound input through both the first sound receiver 111 and the second sound receiver 112, not only one sound receiver.

FIG. 4 is a flowchart for explaining operations of an electronic device according to an embodiment of the disclosure.

Referring to FIG. 4, in operation 410, the electronic device 100 may recognize whether the sound input received from the first sound receiver 111 corresponds to the trigger word or phrase.

For example, the electronic device 100 may continuously record sounds received from the outside by using a microphone or the like, and when it is has determined that the recorded sound has a valid sound, the electronic device 100 may determine whether the recorded sound corresponds to the trigger word or phrase. The electronic device 100 may compare the recorded sound with a predefined or pre-stored trigger word or phrase, recognize the recorded sound as containing the trigger word or phrase in a case of exceeding a reference threshold for determining that the recorded sound corresponds to the trigger word or phrase, and recognize the recorded sound as not containing the trigger word or phrase in a case of not exceeding the reference threshold.

In operation 420, as the trigger word or phrase has been recognized, the electronic device 100 may output the power control signal to supply the power to the second sound receiver 112 and the sound signal processor 122. As described above, in a case where the second sound receiver 112 has received the power control signal, the second sound receiver 122 may be supplied with the power and then powered on, and may receive the sound input from the outside and transmit the received sound input signal to the sound signal processor 122. In a case where the sound signal processor 122 has received the power control signal, the sound signal processor 122 may be supplied with the power and then powered on, and may process the received sound input signal.

In operation 430, the electronic device 100 may receive the first sound input signal from the first sound receiver 111 and the second sound input signal from the second sound receiver 112, generate a stereo sound by mixing the first sound input signal with the second sound input signal, and output the generated stereo sound, by using the sound signal processor 122 to which the power is being supplied.

Figure 5:
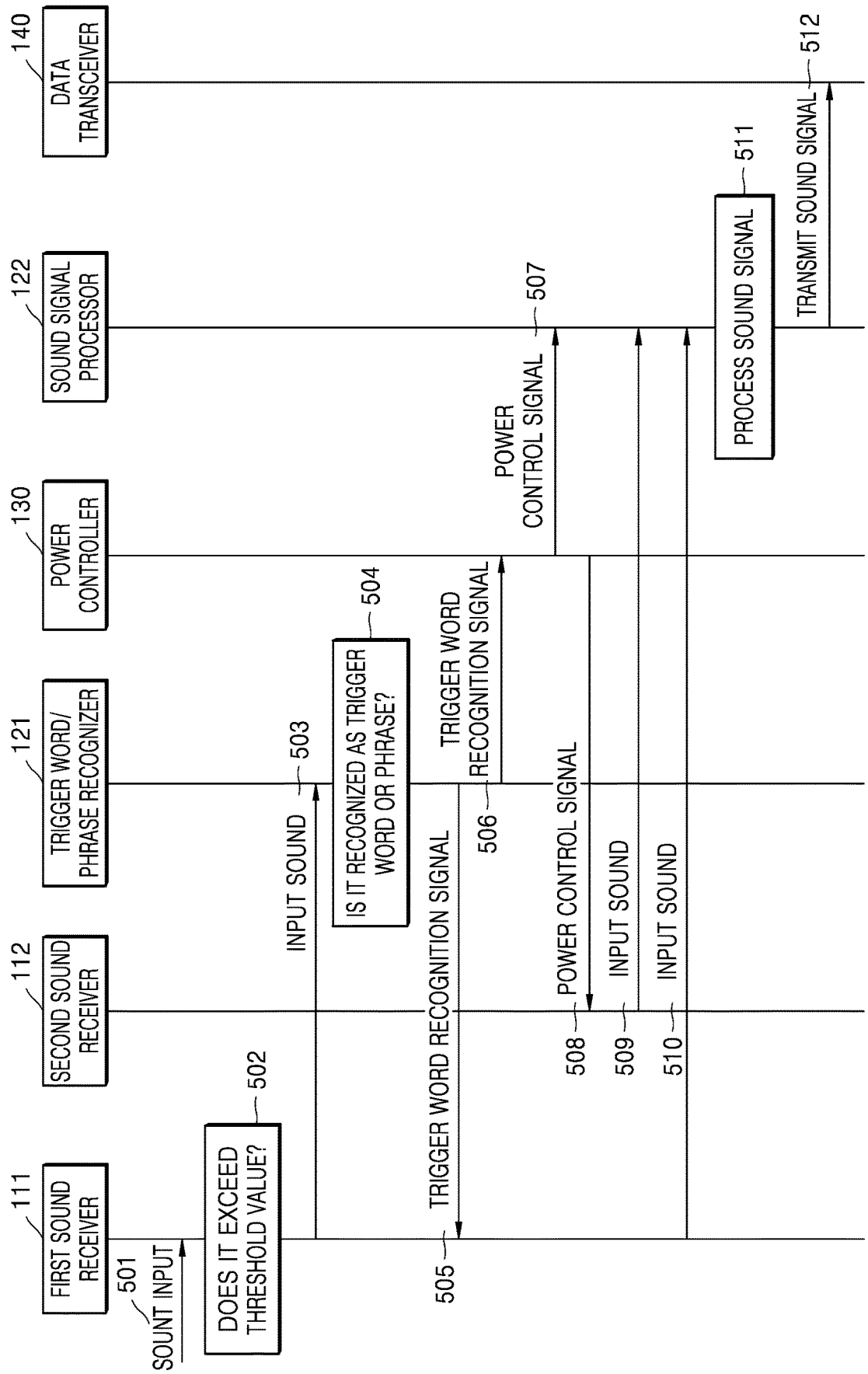
FIG. 5 is a detailed flowchart of speech recognition function operations in an electronic device according to an embodiment of the disclosure.

FIG. 5 is a detailed flowchart of speech recognition function operations in an electronic device according to an embodiment of the disclosure.

Referring to FIG. 5, in operation 501, the first sound receiver 111 may continuously receive sound inputs from the outside. For example, the first sound receiver 111 may continuously store the sound inputs received from the outside.

In operation 502, the first sound receiver 111 may determine whether the stored sound input has valid sound information. For example, the first sound receiver 111 may determine whether a certain feature of the stored sound input exceeds a preset threshold value in order to determine whether the stored sound input has the valid sound information or only a daily noise signal. In a case where the first sound receiver 111 has determined that the certain feature of the stored sound input does not exceed the preset threshold value, that is, there is no specific action required, the first sound receiver 111 may not perform a specific operation.

In operation 503, in a case where the first sound receiver 111 has determined that the certain feature of the stored sound input exceeds the preset threshold value, the first sound receiver 111 may transmit the stored sound input to the trigger word/phrase recognizer 121 to determine whether the sound input corresponds to the trigger word or phrase.

In operation 504, the trigger word/phrase recognizer 121 that has received the input sound from the first sound receiver 111 may determine whether the received input sound corresponds to the trigger word or phrase.

In operation 505, in a case where the trigger word/phrase recognizer 121 has determined that the trigger word or phrase is recognized from the input sound, the trigger word/phrase recognizer 121 may transmit a trigger word recognition signal indicating that the trigger word or phrase has been recognized to the first sound receiver 111.

In operation 506, the trigger word/phrase recognizer 121 may transmit a trigger word recognition signal to the power controller 130.

The power controller 130, which has received the trigger word recognition signal, may transmit the power control signal to the sound signal processor 122 in operation 507, and may transmit the power control signal to the second sound receiver 112 in operation 508. The sound signal processor 122 may normally remain powered off without the power being supplied, and may be supplied with the power and thus powered on upon the reception of the power control signal from the power controller 130, and enter a ready state to operate. The second sound receiver 112 may also normally remain powered off state because it is not normally powered on without the power being supplied, and may be supplied with the power and thus powered on upon the reception of the power control signal from the power controller 130, and enter the ready state to operate.

In operation 509, the second sound receiver 112 to which the power is being supplied may receive the sound input from the outside and transmit the received sound input signal to the sound signal processor 122. That is, only the first sound receiver 111 may operate to monitor the sound inputs until the sound input including the trigger word or phrase is received and the electronic device 100 recognizes the trigger word or phrase, and the second sound receiver 112 may be powered on to operate after the trigger word or phrase is recognized, accordingly, both the first sound receiver 111 and the second sound receiver 112 may receive the sound input and transmit the sound input to the sound processor 120.

In operation 510, the first sound receiver 111 that has received the trigger word recognition signal in operation 505 may transmit the sound input signal to the sound signal processor 122. That is, before the trigger word or phrase is recognized, the first sound receiver 111 may transmit the sound input signal to the trigger word/phrase recognizer 121 in order to determine whether the trigger word or phrase is included in the sound input signal, but after the trigger word or phrase is recognized, the first sound receiver 111 may transmit the sound input signal to the sound signal processor 122 in order to perform the sound processing on the received sound input signal.

In operation 511, the sound signal processor 122 may perform the sound signal processing by mixing the first sound input signal received from the first sound receiver 111 with the second sound input signal received from the second sound receiver 112.

In operation 512, the sound signal processor 122 may transmit a processed sound signal to the data transceiver 140.

Figure 6:
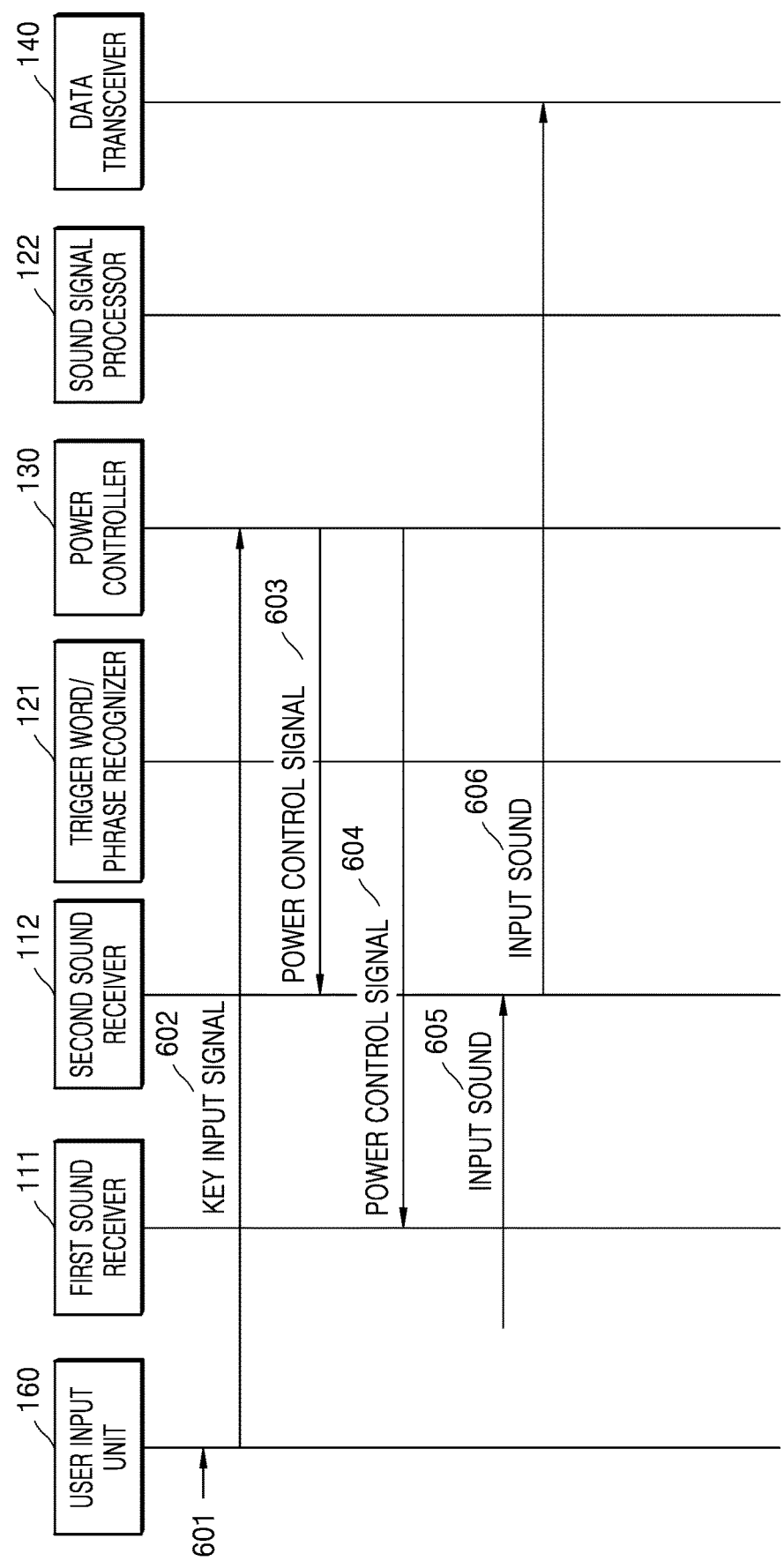
FIG. 6 is a detailed flowchart of speech recognition function operations in an electronic device according to an embodiment of the disclosure.

FIG. 6 is a detailed flowchart of speech recognition function operations in an electronic device according to an embodiment of the disclosure.

Referring to FIG. 6, in operation 601, the user input unit 160 may receive a user input for requesting the speech recognition function. Examples of the user input for requesting the speech recognition function may include a signal indicating that the speech recognition function button has been pressed by the user.

In operation 602, the user input unit 160 may transmit, to the power controller 130, a key input signal generated in response to the user input for requesting the speech recognition function.

In operation 603, the power controller 130 may transmit the power control signal to the second sound receiver 112 for the speech recognition function according to the key input, upon the reception of the key input signal.

In operation 604, the speech recognition function may be initiated upon the reception of the key input signal, and because the first sound receiver 111, which is being supplied with the power for the long-range speech recognition, may not need to operate while the second sound receiver 112 is operating to perform the speech recognition function according to the key input, the power controller 130 may transmit a control signal for ceasing the power supply to the first sound receiver 111. In operation 605, the second sound receiver 112, which normally remains powered off without the power being supplied, may be supplied with the power and thus powered on by the power control signal received from the power controller 130, to receive the input sound.

In operation 606, the second sound receiver 112 may transmit the received input sound to the data transceiver 140.

In a case where the second sound receiver 112 no longer receives a sound input for performing the speech recognition function according to the key input, the power controller 130 may transmit the power control signal for supplying the power to the first sound receiver 111 and may transmit a power control signal for ceasing the power supply to the second sound receiver 112, to enable the electronic device 100 to enter the standby state.

Figure 7:
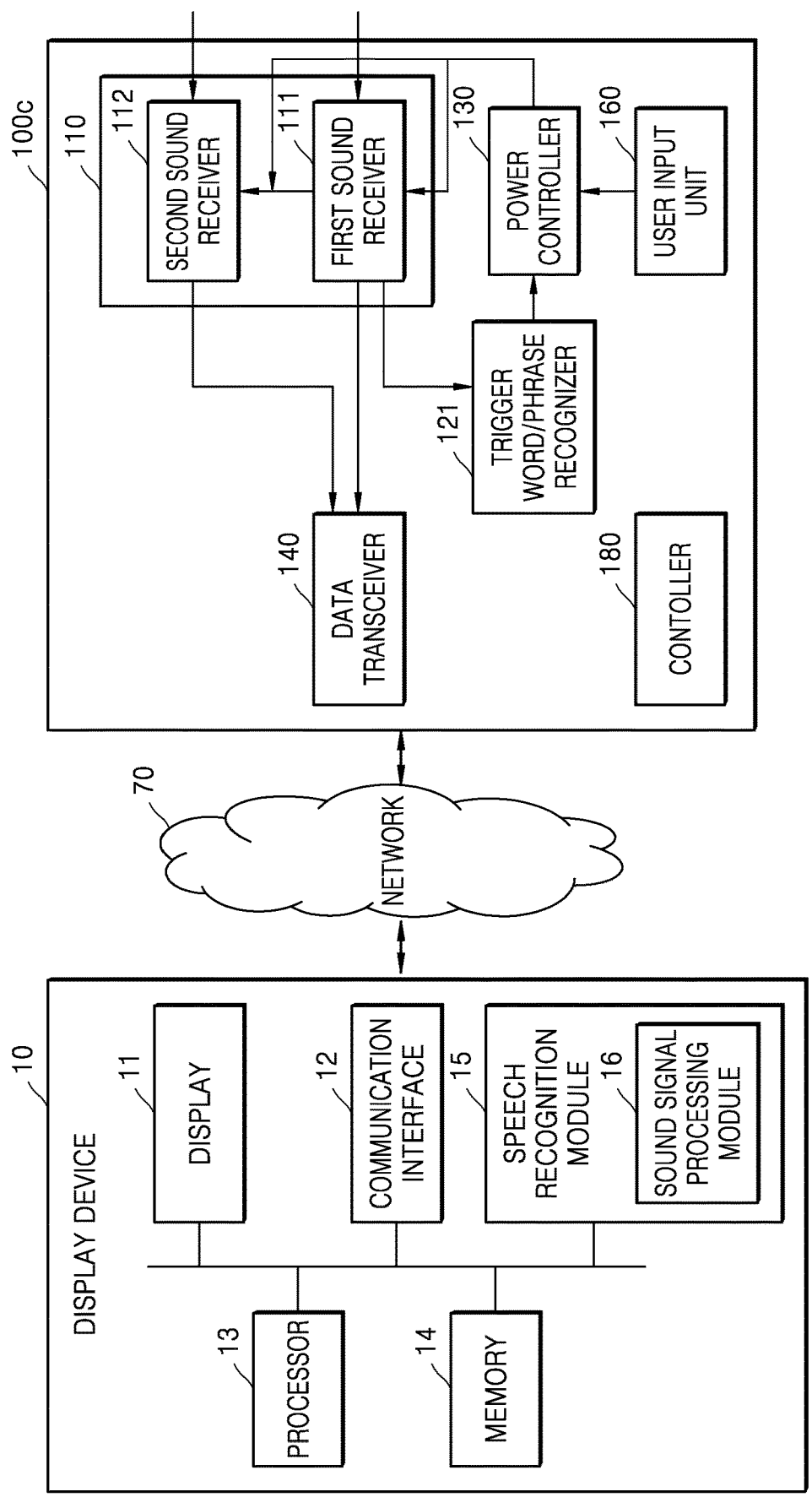
FIG. 7 illustrates another example of an electronic device according to an embodiment of the disclosure.

FIG. 7 illustrates another example of an electronic device according to an embodiment of the disclosure.

Referring to FIG. 7, a system to which an electronic device 100c according to another embodiment of the disclosure is applied may include a display device 10, the electronic device 100c, and a network 70 through which the display device 10 communicates with the electronic device 100c.

According to an embodiment of the disclosure, the electronic device 100c may include the sound receiver 110, the trigger word/phrase recognizer 121, the power controller 130, the data transceiver 140, the user input unit 160, and the controller 180. At least some elements of the electronic device 100c, for example, the sound receiver 110, the trigger word/phrase recognizer 121, the power controller 130, the data transceiver 140, and the user input unit 160 may be electrically connected to the controller 180.

The electronic device 100c of FIG. 7 is similar to the electronic device 100 of FIG. 2, but is different from the electronic device 100 of FIG. 2 in that the electronic device 100c does not include the sound signal processor 122.

In the electronic device 100 of FIG. 2, the sound signal processor 122 mixes the first sound input signal from the first sound receiver 111 with the second sound input signal from the second sound receiver 112, or performs filtering or the like and outputs the mixed signals to the outside. However, in the electronic device 100c of FIG. 7, the sound signal processor is not included in the electronic device 100c, and the display device 10 may include a sound signal processing module 16 that serves as the sound signal processor. Accordingly, the electronic device 100c of FIG. 7 may transmit the received first sound input signal and second sound input signal to the display device 10 without performing the sound signal processing, and then the display device 10 may perform mixing or filtering on the received first sound input signal and second sound input signal.

The elements of the electronic device 100c of FIG. 7 perform the same functions as those of the electronic device 100c referred to by the same reference numerals in FIG. 2, thus redundant descriptions will be omitted, and operations different from those of the elements of the electronic device 100 of FIG. 2 will be described.

According to an embodiment of the disclosure, the trigger word/phrase recognizer 121, which has received the sound input signal from the first sound receiver 111 to which the power is supplied in the standby state, may recognize whether the received sound input signal corresponds to the trigger word or phrase, and may transmit the trigger word recognition signal to the power controller 130 in a case where the received sound input signal has been determined as corresponding to the trigger word or phrase. The power controller 130 that has received the trigger word recognition signal, may control the power to be supplied to the second sound receiver 112 such that the second sound receiver 112 may receive the sound input. The first sound input signal received by the first sound receiver 111 and the second sound input signal received by the second sound receiver 112 may be transmitted directly to the data transceiver 140 without the sound signal processing, and the data transceiver 140 may transmit the received first sound input signal and second sound input signal to the display device 10 through the network 70.

According to an embodiment of the disclosure, the power controller 130 that has received the key input signal from the user input unit 160 may control the power to be supplied to the second sound receiver 112 such that the second sound receiver 112 may receive the sound input. The second sound input signal received by the second sound receiver 112 may be transmitted directly to the data transceiver 140, and the data transceiver 140 may transmit the received second sound input signal to the display device 10.

According to an embodiment of the disclosure, when the power controller 130 that has received the key input signal from the user input unit 160 controls the power to be supplied to the second sound receiver 112, the power controller 130 may also control the power supply to the first sound receiver 111 to be ceased. As described above, in a case where only the second sound input signal from the second sound receiver 112 is transmitted to the display device 10 according to the key input signal, the power supply to the first sound receiver 112 may be ceased, and thus the power consumption may be further reduced.

According to an embodiment of the disclosure, when speech reception according to the key input signal is terminated, that is, when a sound input is no longer received by the second sound receiver 112, the power controller 130 may control the power supply to the second sound receiver 112 to be ceased, and may resume the power supply to the first sound receiver 111 in order for the electronic device 100c to enter the standby state.

According to an embodiment of the disclosure, the display device 10 may include a display 11, a communication interface 12, a processor 13, a memory 14, and a speech recognition module 15. At least some elements of the display device 10, for example, the display 11, the communication interface 12, the memory 14, and the speech recognition module 15 may be electrically connected to the processor 13. In various embodiments of the disclosure, the display device 10 may be referred to as an electronic device or a computing device. The display device 10 may further include elements in addition to the elements illustrated in FIG. 7, or some elements may be omitted.

According to an embodiment of the disclosure, the display 11 may display an image, a video, and/or an execution screen of an application.

The communication interface 12 according to an embodiment of the disclosure may establish wired or wireless communication with the electronic device 100c according to a specified protocol. The communication interface 12 may receive the sound input signal to be used for the speech recognition from the electronic device 100c based on the wired or wireless communication.

The communication interface 12 may include one or more modules that enable wireless communication between the display device 10 and a wireless communication system or between the display device 10 and a network in which another electronic device is located. For example, the communication interface 12 may include a broadcast receiving module, a mobile communication module, a wireless Internet module, and a short-range communication module. The communication interface 12 may be referred to as a transceiver.

The broadcast receiving module may receive a broadcast signal and/or broadcast-related information from an external broadcast management server through a broadcast channel. The mobile communication module may transmit and receive a wireless signal to and from at least one of a base station, an external terminal, or a server on a mobile communication network. The wireless Internet module refers to a module for wireless Internet connection, and examples of the wireless Internet technology may include wireless LAN (WLAN) (WiFi), wireless broadband (Wibro), worldwide interoperability for microwave access (Wimax), and high-speed downlink packet access (HSDPA). The short-range communication module is for communicating within a short distance range. Some examples of the short-range communication technology are Bluetooth, radio frequency identification (RFID), infrared data association (IrDA), ultra wideband (UWB), and ZigBee.

According to an embodiment of the disclosure, the memory 14 may include at least one of flash memory, a hard disk, a multimedia card micro, card-type memory (e.g., SD or XD memory), random access memory (RAM), static random access memory (SRAM), read-only memory (ROM), electrically erasable programmable read-only memory (EEPROM), programmable read-only memory (PROM), magnetic memory, a magnetic disc, or an optical disc.

According to an embodiment of the disclosure, the memory 14 may store a plurality of applications. The plurality of applications stored in the memory 14 may be selected and executed according to a user input. According to an embodiment of the disclosure, the memory 14 may store the plurality of applications, and the plurality of applications may be loaded into the processor 13 to be executed.

According to an embodiment of the disclosure, the processor 13 may control an overall operation of the display device 10. For example, the processor 13 may control the memory 14 to load or store necessary information.

According to an embodiment of the disclosure, the processor 13 may execute instructions stored in the memory 14 to execute a content sharing application. Various modules mentioned in various embodiments of the disclosure may be implemented by hardware, software, or a combination of hardware and software.

According to an embodiment of the disclosure, the speech recognition module 15 may perform the speech recognition function based on the sound input signal received from the electronic device 100c. The speech recognition module 15 may include the sound signal processing module 16. In a case where the sound signal processing module 16 has received the first sound input signal and the second sound input signal from the electronic device 100c according to the long-range speech recognition function, the sound signal processing module 16 may mix the first sound input signal with the second sound input signal or may perform denoising filter processing. The speech recognition module 15 may be implemented by hardware, software, or a combination of hardware and software. In a case where the sound signal processing module 16 has received the second sound input signal from the electronic device 100c according to the short-range speech recognition function, the sound signal processing module 16 may perform the denoising filter processing on the second sound input signal. The denoising filter processing performed on the sound input signal for the long-range speech recognition may be implemented differently from the denoising filter processing performed on the sound input signal for the short-range speech recognition.

Figure 8:
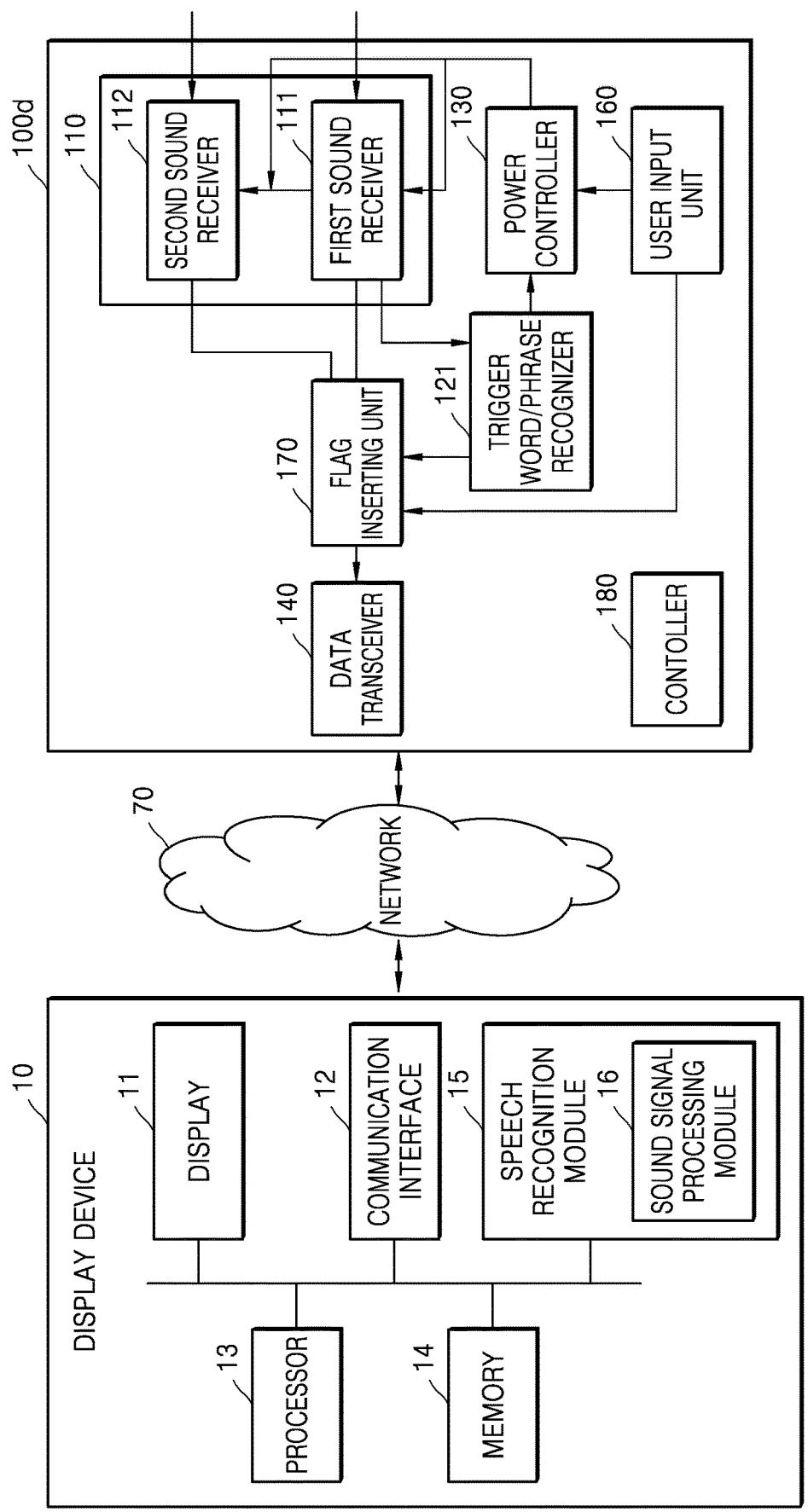
FIG. 8 illustrates another example of an electronic device according to an embodiment of the disclosure.

FIG. 8 illustrates another example of an electronic device according to an embodiment of the disclosure.

Referring to FIG. 8, a system to which an electronic device 100d according to another embodiment of the disclosure is applied is the same as the system illustrated in FIG. 7. However, unlike the electronic device 100c, the electronic device 100d may further include a flag inserting unit 170.

Because the electronic device 100d illustrated in FIG. 8 does not include the sound signal processor, the first sound input signal and the second sound input signal received according to the recognition of the trigger word or phrase may be transmitted directly to the display device 10 without the sound signal processing, or the second sound input signal may be transmitted directly to the display device 10 according to the key input signal. In this case, the first sound input signal and the second sound input signal transmitted according to the recognition of the trigger word or phrase may need to be mixed into a single signal in the display device 10. Alternatively, the first sound input signal and the second sound input signal transferred according to the recognition of the trigger word or phrase may need to undergo denoising filter processing that is different from the denoising filter processing performed on the second sound input signal transferred according to the key input signal. To this end, it may be preferable to add flag information for the display device to determine whether the sound signal transmitted from the electronic device to the display device is for the long-range speech recognition according to the recognition of the trigger word or phrase, or is for the short-distance speech recognition according to the key input signal. Accordingly, the electronic device 100d illustrated in FIG. 8 may further include the flag inserting unit 170 for adding the flag information.

According to an embodiment of the disclosure, the trigger word/phrase recognizer 121, which has received the sound input signal from the first sound receiver 111 to which the power is supplied in the standby state, may determine whether the received sound input signal corresponds to the trigger word or phrase, and may transmit the trigger word recognition signal to the power controller 130 and the flag inserting unit 170, in a case where the received sound input signal has been determined as corresponding to the trigger word or phrase. The power controller 130 that has received the trigger word recognition signal may control the power to be supplied to the second sound receiver 112 such that the second sound receiver 112 may receive the sound input. The flag inserting unit 170 may receive the first sound input signal received by the first sound receiver 111 and the second sound input signal received by the second sound receiver 112, insert flags indicating a signal according to the recognition of the trigger word or phrase, into the signals, before transmitting the signals to the data transceiver 140, and transmit the signals into which the flags are inserted, to the data transceiver 140. The sound signal processing module 16 of the display device 10, that has received the signals into which the flags are inserted, may obtain the flags by parsing the received signals, to confirm that the received first sound input signal and second sound input signal are for the long-range speech recognition according to the flags, and accordingly, perform mixing or the denoising filter processing suitable for the long-range speech recognition on the first sound input signal and the second sound input signal.

According to an embodiment of the disclosure, in a case where the user input unit 160 has received a key input, the user input interface 150 may transmit the key input signal to the power controller 130 and may also transmit the key input signal to the flag inserting unit 170. The power controller 130 that has received the key input signal may control the power to be supplied to the second sound receiver 112 such that the second sound receiver 112 may receive the sound input. The second sound input signal received by the second sound receiver 112 may be transmitted to the flag inserting unit 170, and the flag inserting unit 170 may insert a flag indicating a signal for the short-range speech recognition into the second sound input signal, based on the key input signal received from the user input unit 160, and may transmit the signal into which the flag is inserted, to the data transceiver 140. The sound signal processing module 16 of the display device 10 that has received the signal into which the flag is inserted, may obtain the flag by parsing the received signal, and may perform the denoising filter processing suitable for the short-range speech recognition according to the flag.

In the above description, a method of inserting flags separately into the sound input signals sent according to the recognition of the trigger word or phrase, and the sound input signal sent according to the key input signal has been described, but the embodiments of the disclosure are not limited thereto. A flag capable of distinguishing a signal sent for the long-range speech recognition from a signal sent for the short-range speech recognition may be sufficient.

In order to distinguish the signal sent for the long-range speech recognition from the signal sent for the short-range speech recognition, for example, a method of inserting a flag into the first sound input signal may be considered. In the example described above, because the first sound input signal and the second sound input signal may be transmitted together according to the recognition of the trigger word or phrase, while the second sound input signal may be solely transmitted according to the key input signal, in a case where the flag is inserted only into the first sound input signal, the display device 10 may determine that the sound processing according to the long-range speech recognition is required with reference to the flag inserted into the first sound input signal.

Some embodiments of the disclosure may be implemented as a computer-readable recording medium, e.g., a program module to be executed in computers, which includes computer-readable instructions. The computer-readable recording medium may be any available medium which is accessible by a computer, and may include a volatile or non-volatile medium and a detachable or non-detachable medium. The computer-readable recording medium may also include a computer storage medium. The computer storage medium includes both volatile and non-volatile, detachable or non-detachable media implemented using any method or technique for storing information such as computer-readable instructions, data structures, program modules or other data.

The embodiments of the disclosure may be implemented in a software (S/W) program including instructions stored in a computer-readable storage medium.

The computer may be a device capable of calling the stored instructions from the storage medium and operating according to the embodiments disclosed herein, based on the called instructions, and may include an electronic device according to the embodiments of the disclosure.

The computer-readable storage medium may be provided in the form of a non-transitory storage medium. Here, the term "non-transitory" simply means that the storage medium is tangible and does not refer to a transitory electrical signal, but does not distinguish that data is stored semi-permanently or temporarily in the storage medium.

Control methods according to the embodiments disclosed herein may be provided in computer program products. The computer program products may be traded as commodities between sellers and buyers.

The computer program products may include S/W programs or computer-readable storage media storing the S/W programs. For example, the computer program products may include S/W program-type products (e.g., downloadable applications) that are electronically distributed through manufacturers of electronic devices or electronic markets (e.g., Google™ Play Store or App Store). For electronic distribution, at least a part of the S/W programs may be stored in storage media or may be temporarily generated. In this case, the storage media may be storage media of servers of manufacturers, servers of electronic markets, or relay servers that temporarily store the S/W programs.

The computer program product may include a storage medium of a server or a storage medium of an electronic device in a system which includes the server and the electronic device. Alternatively, when there is a third device (for example, a smart phone) that communicates with the server or the electronic device, the computer program product may include a storage medium of the third device. Alternatively, the computer program product may include an S/W program itself that is transmitted from the server to the electronic device or the third device, or transmitted from the third device to the electronic device.

In this case, one of the server, the electronic device, and the third device may perform the method according to the disclosed embodiments by executing the computer program product. Alternatively, two or more of the server, the electronic device, and the third device may perform the method according to the disclosed embodiments in a distributed manner by executing the computer program product.

For example, the server (for example, a cloud server, an artificial intelligence server, or the like) may execute the computer program product stored in the server, thereby controlling the electronic device to perform the method according to the disclosed embodiments, the electronic device communicating with the server.

In another example, the third device may execute the computer program product, thereby controlling the electronic device to perform the method according to the disclosed embodiments, the electronic device communicating with the third device. When the third device executes the computer program product, the third device may download the computer program product from the server, and may execute the downloaded computer program product. Alternatively, the third device may perform the method according to the disclosed embodiments by executing a pre-loaded computer program product.

In addition, in the specification, the term "unit" may be a hardware component such as a processor or a circuit, and/or a software component executed by a hardware component such as a processor.

According to various embodiments of the disclosure, in an electronic device having a speech recognition function, some elements performing the speech recognition function may operate by supplying power thereto when a trigger word or phrase has been recognized, such that all elements performing the speech recognition function do not need to be supplied with the power all the time, and thus power consumption may be reduced.

While the embodiments of the disclosure have been particularly shown and described, it will be understood by one of ordinary skill in the art that various changes in form and details may be made therein without departing from the spirit and scope of the disclosure. Hence, it should be understood that the embodiments of the disclosure described above are not limiting of the scope of the disclosure. For example, each element described in a single type may be executed in a distributed manner, and elements described distributed may also be executed in an integrated form.

The scope of the disclosure is not defined by the detailed description of the disclosure but by the following claims, and all modifications or alternatives derived from the scope and spirit of the claims and equivalents thereof fall within the scope of the disclosure.

What is claimed is:

1. An electronic device comprising:
   a first sound receiver configured to receive a first sound input while power is supplied to the first sound receiver in a standby state of the electronic device;
   a trigger word/phrase recognizer configured to recognize whether the first sound input received by the first sound receiver corresponds to a trigger word or phrase;
   a second sound receiver configured to receive a second sound input by receiving supply of power based on the trigger word or phrase being recognized by the trigger word/phrase recognizer;
   a sound signal processor configured to remain in a power-off state in the standby state of the electronic device, and based on the trigger word or phrase being recognized by the trigger word/phrase recognizer, change the power-off state to a power-on state for receiving the power, receive a first sound input signal corresponding to the first sound input from the first sound receiver and a second sound input signal corresponding to the second sound input from the second sound receiver, and process the first sound input signal and the second sound input signal; and a data transceiver configured to output the first sound input signal and the second sound input signal.

2. The electronic device of claim 1, further comprising a power controller configured to control the power to be supplied to the second sound receiver based on a control signal indicating the recognizing of the trigger word or phrase being received from the trigger word/phrase recognizer.

3. The electronic device of claim 2, wherein the sound signal processor is further configured to generate a stereo signal by mixing the first sound input signal with the second sound input signal.

4. The electronic device of claim 2, wherein the power controller is further configured to, based on a key input signal for requesting a speech recognition function being received, supply the power to the second sound receiver, and cease power supply to the first sound receiver, and
 the data transceiver is further configured to receive the second sound input signal from the second sound receiver operating and output the received second sound input signal.

5. The electronic device of claim 4, wherein the power controller is further configured to control cease power supply to the second sound receiver based on the speech recognition function being terminated.

6. An electronic device comprising:
 a first sound receiver configured to receive a sound input while power is supplied to the first sound receiver in a standby state of the electronic device;
 a trigger word/phrase recognizer configured to recognize whether the sound input received by the first sound receiver corresponds to a trigger word or phrase;
 a second sound receiver configured to receive a sound input by receiving supply of power based on the trigger word or phrase being recognized by the trigger word/phrase recognizer;
 a data transceiver configured to output a first sound input signal supplied from the first sound receiver and a second sound input signal supplied from the second sound receiver; and
 a flag inserting unit configured to insert, into the second sound input signal output in response to a key input signal for requesting a speech recognition function, a flag for distinguishing the second sound input signal output in response to the key input signal from the first sound input signal output in response to the recognizing of the trigger word or phrase.

7. The electronic device of claim 6, wherein, based on the flag, the second sound input signal output in response to the key input signal is subjected to sound processing that is different from sound processing to be performed on the first sound input signal output in response to the recognizing of the trigger word or phrase.

8. The electronic device of claim 4, further comprising a switch connected to the second sound receiver,
 wherein the switch is configured to transmit, based on the key input signal requesting the speech recognition function being received, the second sound input signal supplied from the second sound receiver to the data transceiver, or transmit, based on the recognizing of the trigger word or phrase, the second sound input signal to the sound signal processor configured to process the second sound input signal with the first sound input signal.

9. An operation method of an electronic device, the operation method comprising:
 receiving a first sound input, by a first sound receiver to which power is supplied in a standby state of the electronic device;
 recognizing whether the first sound input received by the first sound receiver corresponds to a trigger word or phrase;
 receiving a second sound input by a second sound receiver to which the power is supplied based on the trigger word or phrase being recognized;
 based on the trigger word or phrase being recognized, changing a power-off state of a sound signal processor to a power-on state, receiving, by the sound signal processor in the power-on state, a first sound input signal corresponding to the first sound input from the first sound receiver and a second sound input signal corresponding to the second sound input from the second sound receiver, and processing, by the sound signal processor in the power-on state, the first sound input signal and the second sound input signal, wherein the sound signal processor remains in the power-off state in the standby state of the electronic device, and the sound signal processor is supplied with the power in the power-on state; and
 outputting, by a data transceiver, the first sound input signal and the second sound input signal.

10. The method of claim 9, further comprising controlling, by a power controller, the power to be supplied to the second sound receiver based on a control signal indicating the recognizing of the trigger word or phrase being received.

11. The method of claim 10, further comprising generating, by the sound signal processor, a stereo signal by mixing the first sound input signal with the second sound input signal.

12. The method of claim 10, further comprising:
 supplying, by the power controller, based on a key input signal for requesting a speech recognition function being received, the power to the second sound receiver, and ceasing, by the power controller, power supply to the first sound receiver, and
 receiving, by the data transceiver, the second sound input signal from the second sound receiver operating based on the power being supplied, and outputting, by the data transceiver, the received second sound input signal.

13. The method of claim 12, further comprising ceasing power supply to the second sound receiver based on the speech recognition function being terminated.

14. An operation method of an electronic device, the operation method comprising:
 receiving a sound input, by a first sound receiver to which power is supplied in a standby state of the electronic device;
 recognizing whether the sound input received by the first sound receiver corresponds to a trigger word or phrase;
 receiving a sound input by a second sound receiver to which the power is supplied based on the trigger word or phrase being recognized;

outputting, by a data transceiver, a first sound input signal supplied from the first sound receiver and a second sound input signal supplied from the second sound receiver; and inserting into the second sound input signal output in response to a key input signal for requesting a speech recognition function being received, a flag for distinguishing the second sound input signal output in response to the key input signal from the first sound input signal output in response to the recognizing of the trigger word or phrase.

15. The method of claim 14, further comprising, based on the flag, performing, on the second sound input signal output in response to the key input signal, sound processing that is different from sound processing to be performed on the first sound input signal output in response to the recognition of the trigger word or phrase.

16. The method of claim 12, further comprising transmitting, by a switch, based on the key input signal requesting the speech recognition function being received, the second sound input signal supplied from the second sound receiver to the data transceiver, or transmitting, based on the recognizing of the trigger word or phrase, the second sound input signal to the sound signal processor configured to process the second sound input signal with the first sound input signal.

17. A computer readable recording medium comprising a program executing an operation method of an electronic device, the operation method comprises:

receiving a first sound input, by a first sound receiver to which power is supplied in a standby state of the electronic device;

recognizing whether the first sound input received by the first sound receiver corresponds to a trigger word or phrase;

receiving a second sound input by a second sound receiver to which the power is supplied based on the trigger word or phrase being recognized;

based on the trigger word or phrase being recognized, changing a power-off state of a sound signal processor to a power-on state, receiving, by the sound signal processor in the power-on state, a first sound input signal corresponding to the first sound input from the first sound receiver and a second sound input signal corresponding to the second sound input from the second sound receiver, and processing, by the sound signal processor in the power-on state, the first sound input signal and the second sound input signal, wherein the sound signal processor remains in the power-off state in the standby state of the electronic device, and the sound signal processor is supplied with the power in the power-on state; and outputting, by a data transceiver, the first sound input signal and the second sound input signal.

\* \* \* \* \*